3,745,031
INSULATING COMPOSITION

Benjamin B. Kaplan, West Hartford, Conn., assignor to Albi Manufacturing Corporation, Rockville, Conn.
No Drawing. Filed Sept. 17, 1971, Ser. No. 181,571
Int. Cl. C09d 5/18
U.S. Cl. 106—15 FP                                   4 Claims

ABSTRACT OF THE DISCLOSURE

An insulating coating comprising a magnesium oxychloride cement covered by an intumescent paint is applied to structural steel to provide heat and fire insulation for exposure periods greater than two hours.

BACKGROUND OF THE INVENTION

Field of the invention

This invention relates to an insulating composition and more particularly relates to an insulating coating for protecting structural steel members from heat and fire.

Description of the prior art

The growing importance of protecting structural steel members from the heat of fire is well recognized. In the past, steel has been protected by intumescent coatings, such as the intumescent paints disclosed in U.S. Pat. 3,284,216. These intumescent paints provide adequate protection for exposure periods of up to two hours, but it has not been found economically feasible to apply such coatings in a thickness sufficient to provide longer protection. Although greater protection may be afforded by asbestos-containing insulation, the use of asbestos is ecologically undesirable. Cementitions compositions have been proposed as insulating materials, but the known cementitious materials must be applied in undesirably thick coatings to provide adequate insulation. Moreover, the known cementitious coatings are vulnerable to weathering and water, and those containing excessive amounts of halogen-containing components are hydrolyzed by water to form corrosive hydrochloric acid.

SUMMARY OF THE INVENTION

An object of this invention is to provide a novel heat and fire insulation for structural steel.

Another object is to provide a weather- and water-resistant, asbestos-free, noncorrosive insulation for structural steel.

A further object is to provide such an insulation having an exposure rating greater than two hours.

These and other objects are attained by (1) coating structural steel with a magnesium oxychloride cementitious composition comprising magnesium oxide, magnesium chloride, perlite, glass fibers, marble, and clay, the concentration of magnesium chloride being not higher than 25% by weight, and (2) overcoating this base layer with an intumescent paint.

DESCRIPTION OF THE PREFERRED EMBODIMENTS

As indicated above, the base layer of the insulating coating should contain not more than 25% by weight of magnesium chloride. Higher concentrations would create a corrosion problem and accelerate the setting time of the cementitious coating, thus making the composition difficult to work. Concentrations lower than about 12% retard the setting time and thus delay the application of the intumescent coating. Accordingly, the cementitions composition usually contains about 12–25%, preferably about 15–19%, by weight of magnesium chloride.

The remainder of the composition is usually composed of about 20–40% by weight of magnesium oxide, about 6–15% by weight of perlite, about 6–10% by weight of glass fibers, about 5–8% by weight of marble, and about 4–7% by weight of clay. If desired, part of the magnesium oxide may be replaced by partially calcined dolomite, i.e., dolomite that has been heated to about 1400° F. and consists essentially of magnesium oxide and calcium carbonate.

The aforementioned components of the cementitious composition may be applied to the surface to be protected in any convenient manner, preferably by spraying an aqueous slurry thereof. Other suitable application techniques include troweling, casting, etc. The thickness of the coating applied to the surface varies with factors such as economic considerations, the potential fire hazard, and the weight of the material but is ordinarily in the range of about 0.375–1 inch, frequently about 0.625 inch. After being applied, the cementitious coating is allowed to dry and cure before the intumescent coating is applied thereover. Ordinarily, the setting and curing time is about 48–72 hours.

The intumescent coating may be any of the known intumescent paints, particularly those disclosed in U.S. Pat. 3,284,216, the disclosure of which is incorporated herein by reference. Although the particular nature of the intumescent coating is not part of the essence of the present invention, it might be mentioned briefly that they normally include a volatile liquid vehicle, a film-forming binder, at least one spumific agent, and usually at least one carbonaceous material which serves to enhance the effect of the spumific agent, as well as other optional ingredients, such as plasticizers, pigments, fillers, dyes, stabilizers, etc. Also, it is frequently desirable for the paints to include about 2–30%, preferably about 8–25%, by weight of glass fibers, which may be coated with a vinyl resin, e.g., polyvinyl chloride, to facilitate their dispersion in the composition. As disclosed in the aforementioned patent, it is preferable for the paints to include 35–150 parts by weight of the film-forming binder, 120–475 parts by weight of the spumific agent, 40–250 parts by weight of additional carbonaceous material, and 0–220 parts by weight of non-film-forming chlorinated material.

In accordance with the invention, the intumescent paint is applied to yield an overcoating having a thickness of about 0.03–0.75 inch, preferably about 0.18–0.5 inch. The thinner overcoatings, e.g., those having a thickness of less than 0.06 inch, are adequate to improve the weather-ability and water-resistance of the insulating coating; but the thicker coatings are preferred to improve the heat and fire resistance.

The following examples are given to illustrate the invention and are not intended as a limitation thereof. Unless otherwise specified, parts mentioned are parts by weight.

EXAMPLE I

Prepare a magnesium oxychloride cementitious composition from the following recipe:

| Component: | Parts |
|---|---|
| Clay | 4.2 |
| Marble | 5.8 |
| Perlite | 8.8 |
| Glass fibers | 7.7 |
| MgO | 31.2 |
| MgCl$_2$ | 18.0 |
| H$_2$O | 24.3 |

Dissolve the magnesium chloride in the water, combine the remaining ingredients, and mix thoroughly. Apply the mixture to an 8-inch steel I-beam so as to provide a wet coating having a thickness of ⅝ inch. Allow the coating to cure and harden overnight at ambient temperature. Then test the coated beam for heat insulating properties in accordance with ASTM procedure E-119. The results are shown below.

| | Temperature (°F.) of— | | |
|---|---|---|---|
| | Furnace | Thermocouple 1 | Thermocouple 2 |
| Time (min.): | | | |
| 5 | 1,000 | 180 | 180 |
| 10 | 1,300 | 340 | 300 |
| 15 | 1,400 | 420 | 370 |
| 20 | 1,460 | 500 | 440 |
| 25 | 1,510 | 560 | 500 |
| 30 | 1,550 | 620 | 580 |
| 35 | 1,580 | 720 | 680 |
| 40 | 1,610 | 820 | 800 |
| 45 | 1,640 | 920 | 920 |
| 47 | | 1,000 | 920 |

At 47 minutes the average temperature exceeded 1000° F., the failure point of this test.

EXAMPLE II

Prepare an intumescent plaint from:

(A) a solvent mixture containing 50 parts butyl lactate, 50 parts toluol, 30 parts isopropanol, 6 parts diisobutyl ketone, and 55 parts high-flash naphtha, (B) 37.5 parts nitrocellulose binder, (C) a plasticizer containing 2 parts of tricresyl phosphate and 17.5 parts of triethyl citrate, (D) a chlorinated material containing 30 parts chlorinated biphenyl, 14.5 parts chlorinated polypropylene, and 15 parts polyvinyl chloride, (E) a carbonaceous ingredient consisting of 62.5 parts tripentaerythritol, (F) 62.5 parts urea-melamine-formaldehyde resin, and (G) a spumific agent consisting of 250 parts of melamine pyrophosphate.

Into four parts of the intumescent paint mix one part of glass finers having a length of about 0.1–1 inch and a coating of polyvinyl chloride.

EXAMPLE III

Coat a steel I-beam with the cementitious composition of Example I to provide a coating having a thickness of ⅝ inch. Then overcoat with 3/16 inch of the intumescent paint of Example II. Test the coated beam in accordance with ASTM procedure E-119. At 150 minutes, the furnace temperature is 1900° F., the Thermocouple 1 temperature is 900° F., and the Thermocouple 2 temperature is 1050° F.

EXAMPLE IV

Repeat Example III except for providing an intumescent coating thickness of ⅜ inch. The insulating coating has an exposure rating of 220 minutes, i.e., 3 hours and 40 minutes.

It is obvious that many variations may be made in the products and processes set forth above without departing from the spirit and scope of this invention.

What is claimed is:

1. An insulating coating for structural steel which comprises the combination of (1) a base layer of a magnesium oxychloride cementitious composition having a thickness of about 0.375–1 inch and comprising about 20–40% by weight of magnesium oxide, about 12–25% by weight of magnesium chloride, about 6–15% by weight of perlite, about 6–10% by weight of glass fibers, about 5–8% by weight of marble, and about 4–7% by weight of clay and (2) an overlayer having a thickness of about 0.03–0.75 inch of intumescent paint containing a volatile liquid vehicle, a film-forming binder, a spumific agent and a carbonaceous material.

2. The coating of claim 1 wherein the cementitious composition consists essentially of about 20–40% by weight of magnesium oxide, about 15–19% by weight of magnesium chloride, about 6–15% by weight of perlite, about 6–10% by weight of glass fibers, about 5–8% by weight of marble, and about 4–7% by weight of clay.

3. The coating of claim 1 wherein the intumescent paint contains about 2–30% by weight of glass fibers.

4. The coating of claim 1 wherein the base layer has a thickness of about 0.625 inch, the intumescent paint layer has a thickness of about 0.18–0.5 inch, and the coating has an exposure rating greater than two hours.

References Cited

UNITED STATES PATENTS

| 2,698,251 | 12/1954 | Shea et al. | 106—120 |
| 3,284,216 | 11/1966 | Kaplan | 106—16 |
| 3,458,327 | 7/1969 | Fraser | 106—14 |
| 3,562,197 | 2/1971 | Sears et al. | 106—15 FP |

LORENZO B. HAYES, Primary Examiner

U.S. Cl. X.R.

106—106; 117—70 A, 70 C, 137

UNITED STATES PATENT OFFICE
CERTIFICATE OF CORRECTION

Patent No. 3745031      Dated 7/10/73

Inventor(s) Benjamin B. Kaplan

It is certified that error appears in the above-identified patent and that said Letters Patent are hereby corrected as shown below:

Column 3, line 28, the numeral "2" should read - - 22 - -.

Signed and sealed this 27th day of November 1973.

(SEAL)
Attest:

EDWARD M. FLETCHER, JR.
Attesting Officer

RENE D. TEGTMEYER
Acting Commissioner of Patents